United States Patent [19]

Greenwood, Jr.

[11] 4,314,630
[45] Feb. 9, 1982

[54] ACCUMULATING CONVEYOR

[76] Inventor: Walter Greenwood, Jr., 505 Brentwood, Dearborn, Mich. 48124

[21] Appl. No.: 124,330

[22] Filed: Feb. 25, 1980

[51] Int. Cl.³ .............................................. B65G 25/00
[52] U.S. Cl. ................................... 198/718; 198/744; 198/751; 198/774
[58] Field of Search ............... 198/460, 718, 744, 751, 198/774

[56] References Cited

U.S. PATENT DOCUMENTS

| 3,385,418 | 5/1968 | Broser | 198/718 |
| 3,500,992 | 3/1970 | Tabor et al. | 198/751 |
| 3,545,600 | 12/1970 | Rudlaff | 198/751 |
| 3,547,254 | 12/1970 | Manetta | 198/718 |
| 3,570,656 | 3/1971 | Manetta | 198/718 |
| 3,786,911 | 1/1974 | Milazzo | 198/718 |
| 3,794,158 | 2/1974 | Greenwood | 198/718 |

FOREIGN PATENT DOCUMENTS 659472  4/1979  U.S.S.R. .......................... 198/718

Primary Examiner—Joseph E. Valenza

[57] ABSTRACT

An accumulating conveyor having a plurality of spaced article support stations. A plurality of conveyor modules are reciprocally mounted along the length of the conveyor, with each module being so mounted as to be movable between a pair of adjacent stations. Each module comprises a housing having a reciprocally mounted actuating rod, the outer ends of which are adapted to alternately engageably abut the outer ends of the actuating rods carried by the modules immediately ahead and behind. Article engaging levers carried by each module become operative upon movement of their associated actuating rods to engage an article in one of the associated support stations to transfer the article to the next advanced or forward station when the modules are reciprocated towards the unload station. Each module has a sensing arm rotatably affixed thereto which detects the presence or absence of an article in the next advanced station. The sensing arm cooperates with an externally mounted actuating lever carried by the module to activate the transfer mechanism in each module which causes reciprocal movement of the actuating rod and raises the article engaging arms to an operative position when the next advanced station is empty. The actuating rod abuts and reciprocates the actuating rod of the next rearward module to place the next module and all succeeding rearward modules in an operative state causing all articles in the support stations behind an empty station to be advanced forward one station as the modules are reciprocated.

12 Claims, 6 Drawing Figures

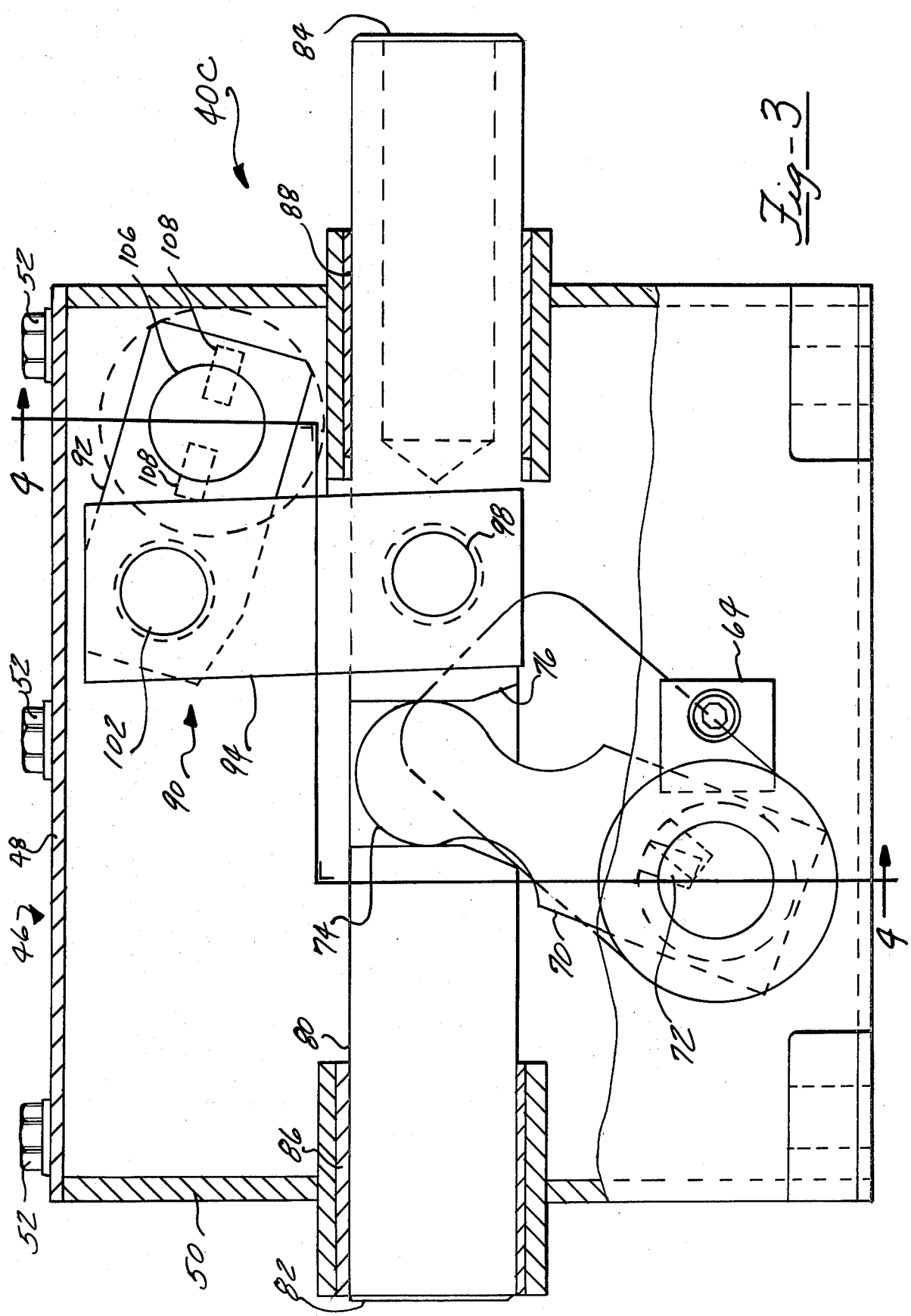

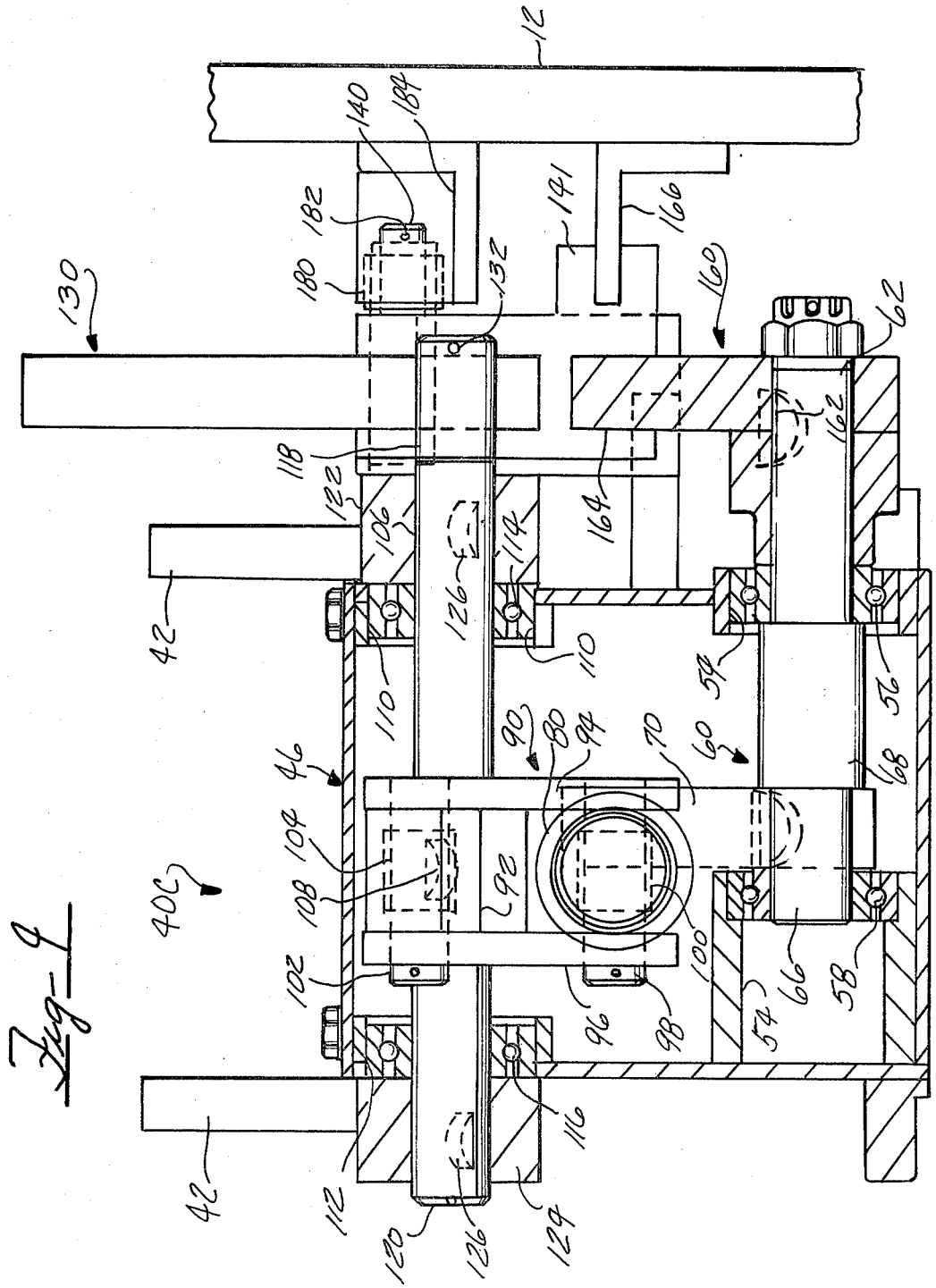

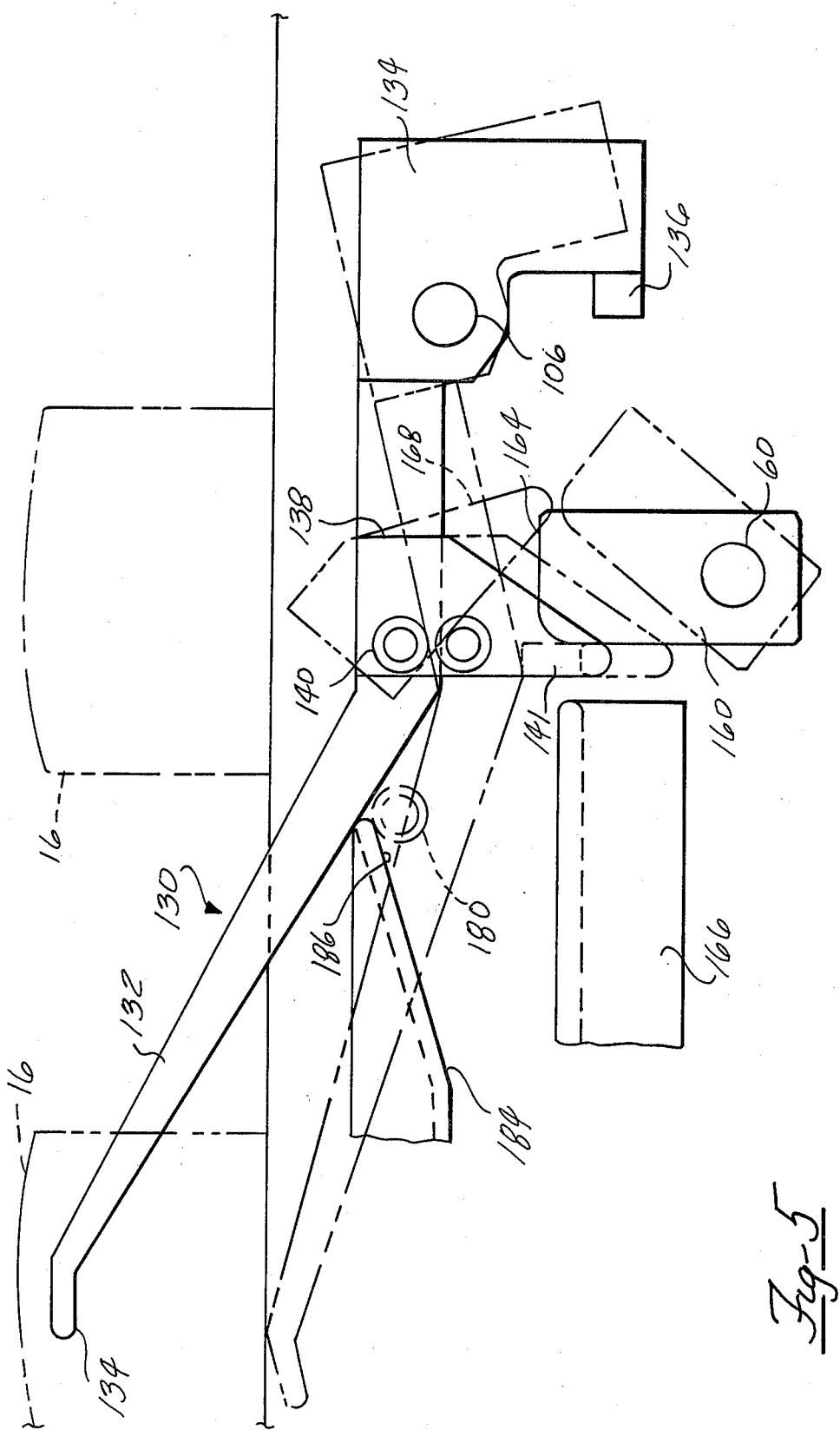

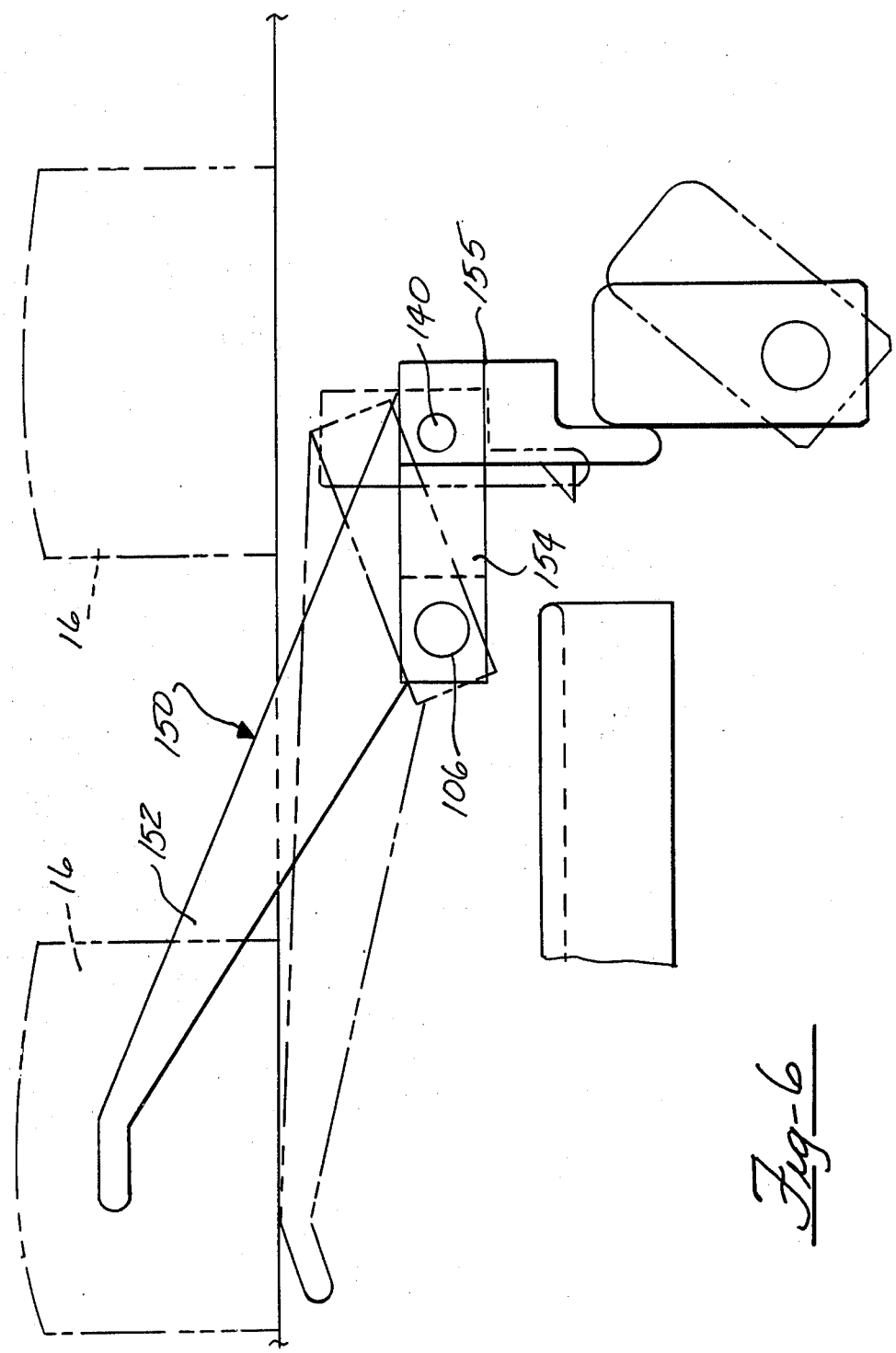

ACCUMULATING CONVEYOR

BACKGROUND OF THE INVENTION

1. Field Of The Invention

This invention relates, in general, to conveyors adapted to convey articles or work pieces and, more particularly, to conveyors of the mechanical accumulating type.

2. Description Of The Prior Art

Conveyors and, in particular, conveyors of the accumulating type are well known and have been employed in many manufacturing operations. In such conveyor systems for supplying articles to assembly stations it has been a practice to provide a multiplicity of stations together with means for advancing articles from station to station. Initially, means were provided that were responsive to the presence or absence of an article at each station such that when an empty station was sensed, an article was advanced from the next rearmost station to fill this empty station. This resulted in vacating the previous station with a sequence of operations being required to move rearmost articles forwardly and the empty station itself was moved back to the beginning of the line and eventually was eliminated by the loading of the conveyor at that point with a new article. For various reasons, articles are removed from intermediate stations between the loading and delivery stations along the conveyor and it is necessary that the conveyor automatically function to advance articles from the load end in order to maintain each station in a filled condition at all times. It is particularly desirable to accomplish the foregoing results by a complete mechanical sensing control and actuating means which is not subject to the unavoidable failures encountered with electrical or electronically controlled systems.

A typical conveyor system which is operative to perform the aforementioned operation may take the form of a pair of elevated and spaced parallel support frames having equally spaced support stations on which the articles are disposed. A suitable conveyor, such as a reciprocating or walking beam type, is adapted to start from an initial position at the beginning of its stroke and engage the articles, move the articles forwardly to the next position wherein the conveyor system disengages the articles and, finally, returns to its initial position. Generally, such systems may comprise a sensing means positioned at each station and, if the station is empty, the sensing means will position itself into an operating mode and cooperate with a suitable mechanism which will engage the articles to achieve the necessary advancement.

In such a conventional conveyor, the sensing means, typically a lever arm, is affixed to the stationary support frame at each article support station. During the forward and reverse strokes of the conveyor, the parts ride over each lever arm. This repeated contact causes wear of the arm which results in early and frequent breakage of the sensing arms.

It is also known to provide a lift and carry type of conveyor to lift articles over interfering plant equipment or to prevent sliding contact between the articles and the conveyor support rails. In this type of conveyor, a suitable mechanism is incorporated into the conveyor drive which initially raises the entire conveyor a predetermined distance to lift the articles off of the support rails before the forward stroke is initiated. At the end of the forward stroke, the conveyor is lowered to deposit the articles in the next advanced position along the support rails. However, since the entire conveyor is raised and lowered as a unit, no accumulation of the articles in the forwardmost positions on the conveyor can be achieved.

Thus, it would be desirable to provide an accumulating conveyor which provides lift and carry features. It would also be desirable to provide an accumulating conveyor which prevents contact between the articles and the sensing members during movement of the articles between successive support stations. Finally, it would be desirable to provide an accumulating conveyor which incorporates a simplified mechanism for transferring the articles between successive support stations.

SUMMARY OF THE INVENTION

There is disclosed herein an accumulating conveyor comprising a plurality of longitudinally spaced carrier modules which become operative when reciprocated relative to a plurality of spaced article support stations and which are adapted to engage articles carried by the support stations and advance them intermittently from a load station to an unload station. Each module is a self-contained, self-lubricating mechanism. Each module carries a sensing means for sensing the presence of an article in the next advanced station. Means are also carried by each module for transferring the articles to the next advanced station. Means for actuating the transferring means cooperates with the sensing means to position the associated transferring means in an operative condition when the next advanced support station is empty. The actuating means comprises a reciprocating rod means having its opposite ends extending outwardly from its associated module for positioning into an operative condition the transfer means of all rearward modules behind the module whose transfer means has become operative.

The unique conveyor of this invention incorporates a simplified mechanism for transferring articles from station to station as the modules are reciprocated. In addition, a lift and carry feature can be incorporated into any module along the conveyor by merely changing the shape of the article engaging mains. This unique feature enables certain modules to be of the lift and carry type while other modules merely push the articles from station to station. Heretofore, in prior art conveyor systems, the entire conveyor, including all of the support stations, was initially lifted upward before the articles were carried to the adjacent stations. Finally, means are provided in the conveyor of this invention to eliminate contact between the sensing means carried by each module and the parts disposed along the article support stations as the modules are reciprocated in both the forward and rearward directions. This eliminates the wear and breakage commonly experienced in similar prior art conveyor apparatus.

BRIEF DESCRIPTION OF THE DRAWING

The various features, advantages and other uses of this invention will become more apparent by referring to the following detailed description and drawing in which:

FIG. 3 is an enlarged fragmentary view of the accumulating conveyor shown in FIG. 1;

FIG. 4 is a cross-sectional view generally taken along line 4—4 in FIG. 3;

FIG. 5 is an enlarged fragmentary view of the accumulating conveyor shown in FIG. 1; and FIG. 6 is an enlarged fragmentary view of another embodiment of the portion of the accumulating conveyor illustrated in FIG. 5.

DESCRIPTION OF THE PREFERRED EMBODIMENTS

Figure 1:
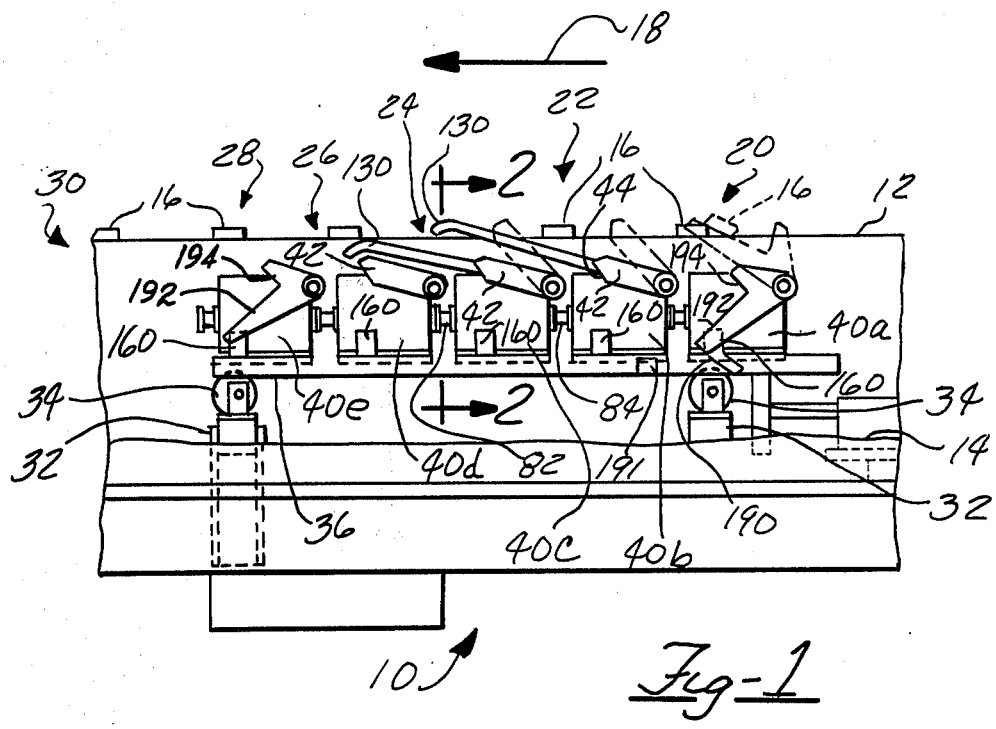
FIG. 1 is a fragmentary, partially sectioned, elevational view of an accumulating conveyor constructed in accordance with the teachings of this invention.

Throughout the following description and drawing, identical reference numbers are used to refer to the same component shown in multiple figures of the drawing.

Figure 2:
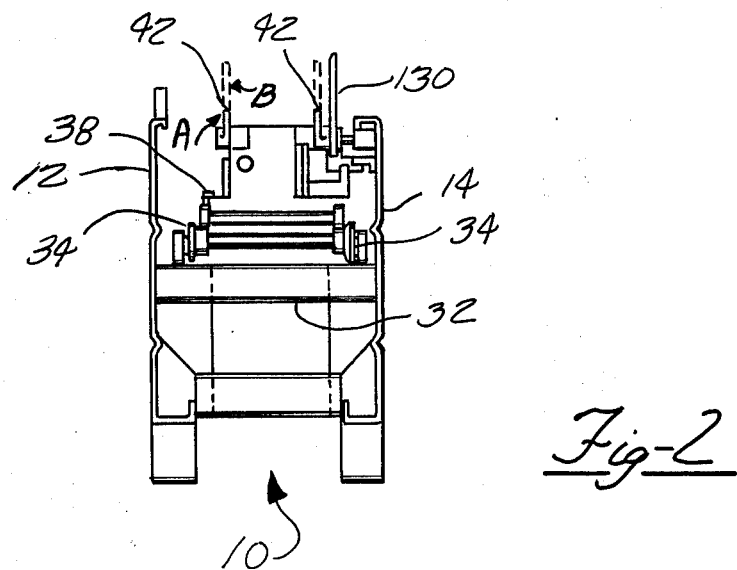
FIG. 2 is a fragmentary, cross-sectional view of the accumulating conveyor, generally taken along line 2—2 in FIG. 1.

Referring now to the drawing and, in particular to FIGS. 1 and 2, there is depicted a simplified version of an accumulating conveyor 10 constructed in accordance with the teachings of this invention. The conveyor 10 comprises two parallel and elevated frames 12 and 14 having a plurality of spaced article support stations on which articles 16 are transferred from the right to the left, as indicated by the arrow 18 in FIG. 1. The present conveyor 10 is illustrated as having four intermediate article support stations 22, 24, 26 and 28 between a load station 20 and an unload station 30. The article support frames 12 and 14 are interconnected by transverse beams 32 which have at their top end rollers 34 that provide a sliding support for a longitudinal carrier support member 36 which may be reciprocated along the longitudinal axis of the frames 12 and 14 by any suitable means, such as a hydraulic cylinder or the like. Carrier support member 36 has fixedly mounted to the top surface thereof by means of fasteners 38, shown in FIG. 2, a plurality of longitudinally aligned identical conveyor modules 40a thru 40e. Since the conveyor modules 40a-e are each identical in construction, only one will be described in detail hereafter; however, it will be understood that the description of one is equally applicable to the other conveyor modules 40. The conveyor modules 40a-e carried by the carrier support member 36 are reciprocated as a unit relative to the support stations and are adapted to engage the articles 16 carried by the support frames to advance the articles 16 to the next forward support station.

Each of the conveyor modules 40a-e has article engaging means, such as a pair of fingers 42, which are movable between a first position A wherein the fingers 42 are in a lowered position and will not engage the articles 16 in their associated module, and a second position B wherein the upper face 44 of each raised article engaging finger 42 is adapted to engage the article 16 in its associated support station and move the article 16 to the next advance support station as its associated module is moved relative to the frames 12 and 14.

Referring now to FIGS. 3 and 4, the module 40c is illustrated as comprising an enclosed hollow housing 46 having a top access cover 48 and a side cover 50 secured to the housing 46 by any suitable means, such as by bolts 52. The covers 48 and 50 permit access into the interior of the enclosed housing 46 to permit assembly and lubrication of the internal mechanism.

With particular reference to FIG. 4, the housing 46 is shown as having a pair of internal recesses or support sleeves 54 which fixedly mount ball bearings 56 and 58. A keeper 64, shown in FIG. 3, which may be in the form of a block, is secured to the exterior of the housing 46 to hold the ball bearing 56 in position within the recess 54.

A shaft 60 has one end, shown generally by reference number 62, which extends externally out of the housing 46. The end portion 62, as well as an opposed end portion 66 of the shaft 60, are constructed of a first reduced diameter, while an intermediate section 68 has an enlarged diameter.

A first link 70 is fixedly secured to the second end portion 66 of the shaft 60 by suitable means, such as a woodruff key and slot arrangement 72. In this manner, the link 70 rotates as a unitary member with the rotation of the shaft 60, by the means described in greater detail hereafter. The link 70, which is illustrated in a position to raise the article engaging means 42, has an end portion 74 which fits within a slot 76 formed in an actuating rod 80. The actuating rod 80 is disposed transverse to the shaft 60 and has opposed ends 82 and 84 which are slidably mounted in bushings 86 and 88, respectively, such that the outer ends 82 and 84 of the rod 80 extend forwardly and rearwardly of the conveyor module 40c. The actuating rod 80 is thus mounted for reciprocating movement forward and rearward of the module 40c. This reciprocating movement is imparted to the actuating rod 80 by means of the link 70 which rotates upon the rotation of the shaft 60 as described above. The rotary motion of the link 70 is translated through the end portion 74 to linear movement of the actuating rod 80 within the bushings 86 and 88.

A pair of pivotably connected link assemblies 90 and 92 are associated with the actuating rod 80. The first link assembly 90 comprises first and second, spaced link members 94 and 96. The link members 94 and 96 are pivotably connected to the actuating rod 80 by means of a cylindrical shaft 98 having a bearing 100 mounted thereto which extends through the first ends of the link members 94 and 96 and the actuating rod 80. In this manner, the link members 94 and 96 are free to pivot about their respective first ends as the actuating rod 80 reciprocates forward and rearward. The link members 94 and 96 are connected at their opposite ends to the first end of the second link member 92 by a similar shaft 102 which also has a bearing 104 centrally mounted thereon. The shaft 102 extends through the link members 94 and 96 and the centrally disposed link 92 to pivotably connect the link members together such that the link members 92, 94 and 96 pivot about the shaft 102 as the actuating rod 80 is reciprocated.

The second end of the link 92 is fixedly secured to a second shaft or rod 106 by suitable means, such as a woodruff key and slot arrangement 108, shown in FIG. 3. The shaft 106 extends transversely to the actuating rod 80 and parallel to the first shaft 60. The shaft 106 extends through recesses 110 and 112 in the housing 46 which fixedly hold bearings 114 and 116 such that the rod or shaft 106 is freely rotatable therein. In addition, the shaft 106 has opposed ends 118 and 120 which extend externally from the housing 46.

Since the second link 92 and the shaft 106 are fixedly secured together, rotation of the link 92 will impart a rotational movement to the shaft 106. As shown in the orientation in FIG. 3, in which the components are positioned such that the article engaging means 42, described in greater detail hereafter, are in a raised or extended position, rotation of the link 70 in a counter-clockwise direction, as viewed in FIG. 3, will impart a linear movement to the actuating rod to the left. The first end of the link 90 will similarly move to the left, with the link 90 pivoting about the shaft 98. The second link 92 will similarly pivot with respect to the first link 90 about the shaft 102 and will move in a counter-clockwise direction. This will impart a counter-clockwise rotary motion to the shaft 106 which has the effect of lowering the article engaging means 42. A reverse movement of the shaft 60 and link 70 will cause the components to move in a reverse manner to raise the article engaging means 42.

As shown in FIG. 4, block members 122 and 124 are fixedly secured to the opposed ends 118 and 120, respectively, of the shaft 106 by suitable means, such as a woodruff key and slot arrangement 126. The block members 122 and 124 serve as a base for the article engaging means 42, which in the preferred embodiment is in the form of opposed fingers which are secured to the block members 122 and 124 by any suitable means, such as by welding.

As shown in FIG. 1, means for sensing the presence of an article 16 in each of the support stations is carried by each conveyor module 40, although only two sensing means 130 are illustrated. The detailed construction and use of the sensing means 130 will be better understood by referring to FIGS. 4, 5 and 6. As shown in FIG. 4, the sensing means 130 is disposed over the end 118 of the shaft 106 in a freely rotatable manner and is held on the shaft 106 by cotter pin 132. The sensing means 130 in the preferred embodiment illustrated in FIG. 5 has an elongated arm portion 132 and body portion 134. The body portion 134 is disposed about the shaft 106 and serves as a counterweight to urge the arm portion 132 of the sensing means 130 continually upward. The arm portion 132 is formed with sufficient length such that the extreme end 134 thereof is disposed in the next advanced article support station so as to detect the presence of an article 16 therein. A stop 136 is provided on the module 40c so as to limit the rotation of the sensing means 130 about the shaft 106. Thus, the end 134 of the sensing means 130 will be continually urged upward so as to assume the position indicated in solid in FIG. 5 when an article is not present in the next advanced work station and will be lowered to the position indicated in phantom when an article 16 is present in the next work station.

A member 138 is pivotably connected to the sensing means 130 at an intermediate portion thereon by means of a cylindrical shaft 140 which extends through the member 138 and the sensing means 130. The member 138 has a depending bottom portion which extends downward below the sensing means 130. The depending portion further includes an elongated flange 141 which extends outward therefrom as illustrated in FIG. 4.

In an alternate embodiment of the sensing means illustrated in FIG. 6, the sensing means 150 is formed with an elongated arm portion 152 and a solid body portion 154 which serves as a counterweight. The body portion 154 is freely and rotatably mounted about the shaft 106. A member 155 is rotatably connected to the rear portion of the sensing means 150 and is rotatable about shaft 140.

Both versions of the sensing means 130 and 150 cooperate with an actuating lever 160 which is fixedly secured to the end portion 62 of the shaft 60 by suitable means, such as a woodruff key and slot arrangement 162. The actuating level 160 has an upstanding arm portion 164 which is adapted to be abutted by the depending portion of the member 138 so as to impart rotary movement to the actuating lever 160 which is translated to rotation of the shaft 60, as described in greater detail hereafter.

In operation, when no article 16 is in the next advanced support station, the sensing lever 130 will assume the position shown in solid in FIG. 5 in which the end portion 134 is in an extreme vertical position. The flange portion 141 of the member 138 is aligned with an angle bracket 166 which is secured to the support frame 12. During forward movement of the module 40c, the flange 141 on the member 138 will strike the angle bracket 166 causing rotation of the member 138 about the shaft 140 to the position indicated in phantom and reference number 168 in FIG. 5. During such rotation, the member 138 abuts the actuating lever 160 causing similar clockwise rotation of the actuating lever 160 and the shaft 60 within the housing 46 of the module 40c. As described above, rotation of the shaft 60 will result in movement of the actuating rod 80 and the links 90 and 92 which will result in the elevating of the article engaging means 42 which will engage the article 16 in the present support station and advance the article to the next advanced support staion in the conveyor 10 upon movement of the carrier support member 36.

When an article 16 is in the next advanced station, the article 16 will cause the end portion 134 of the sensing means 130 to be lowered to the position shown in phantom in FIG. 5. In such a position, the flange 141 on the member 138 will be similarily lowered so as to miss the angle bracket 166 as the module 40c is advanced in the forward direction to the left as viewed in FIG. 5. Thus, no rotation of the member 138 will occur and, similarily, no rotation of the actuating lever 160 will result. Thus, the article engaging means 42 will not be elevated and will remain in a lowered position such that the article 16 is not advanced to the next support station.

Referring briefly to FIG. 1, the general operation of the entire conveyor 10 will now be described. Each conveyor module 40a-e is associated with one support station on the conveyor 10. Thus, conveyor module 40a is associated with the load station 20, conveyor module 40b is associated with the first intermediate station 22 and modules 40c-40e are respectively associated with the remaining support stations 24, 26 and 28. When the article engaging means 42 of the first conveyor module 40a is in the raised position B, the article engaging means 42 will engage the article 16 in the load station 20 when the carrier support 36 is reciprocated to the left, as viewed in FIG. 1, and the article 16 will be transferred to the next advanced support station 22. Simultaneously therewith, the article engaging means 42 carried by the second conveyor module 40b when in a raised position will engage the article 16 carried in article support station 22 and move it forwardly to the next adjacent station 24. Likewise, the article engaging means 42 associated with the modules 40c, 40d and 40e will engage the articles 16 carried respectively in the article support stations 24, 26 and 28 and move them forwardly to support stations 26, 28 and 30, respectively. In the event that a particular support station is empty, such as indicated by support station 24, it is necessary that the articles disposed rearward of the empty support station be moved in a forward direction with the articles forward of the empty station remaining in place. This selected advancement is achieved in the following manner. When a station is sensed to be missing an article, as described above with reference to FIG. 5, upon the initial movement of the modules, rotary motion will be imparted to shaft 60 within the housing through cooperation of the member 138 and the actuating lever 160. This will activate the transferring means within the housing 46 to elevate the associated article engaging means 40 to the raised position as described above. In so doing, the actuating rod 80 which will be reciprocated to the right, as viewed in FIG. 3, to elevate the article engaging means 42 and serves as a means for actuating the transferring means of the rearward conveyor module 40. As shown in FIG. 1, the opposed ends 82 and 84 of the actuating rod associated with the conveyor module 40c extend outward from the conveyor module 40c and abut the corresponding ends of the actuating rods within the adjacent conveyor modules 40b and 40d. Thus, when the actuating 80 reciprocates, such reciprocation is imparted to the actuating rods of the adjacent modules. Since the actuating rod 80 within the conveyor module 40c is initially moved to the right, as viewed in FIG. 3, to raise its associated article engaging means 42, only the rearward conveyor modules 40b and 40a will be actuated and their associated article engaging means elevated so as to advance articles rearward of empty support station 24 forward one station.

Referring now to FIGS. 4 and 5, additional features of this invention will now be described. As illustrated therein, a roller 180 is freely mounted about the end of the shaft 140 extending through the sensing means 130 and the member 138. The roller 180 is secured to the shaft 140 by any suitable means, such as a cotter pin 182. The roller 180 cooperates with an inclined angle bracket 184 mounted to the support frame 12 to lower the arm portion 132 of the sensing means 130 during the forward movement of the conveyor module 40. As shown in FIG. 5, the angle bracket 184 is spaced a slight distance beyond the angle bracket 166. In this manner, during the initial movement of the conveyor module to the left, as viewed in FIG. 5, the angle bracket 166 cooperates with the member 138 rotatably connected to the sensing means 130 to actuate the associated transferring means within the module to raise the article engaging means 42 or to leave the article engaging means 42 in the retracted position, as needed. During continued forward travel of the module 40, the roller 180 will abut the inclined portion 186 of the angle bracket 184 and will ride along such inclined portion. This has the effect of lowering the entire article sensing means 130 such that the end portion 134 of the sensing means 130 is dropped below the bottom of the article 16 carried in the next forward article support station. This prevents contact between the sensing means 130 and the article 16 during both forward and rearward movement of the conveyor module 40.

As shown in FIG. 1, means are provided for resetting the transferring means of all of the conveyor modules 40a–40e immediately at the completion of the forward travel of the carrier support 36. The actuating lever 160 on the first conveyor module 40a is provided with a depending flange portion 190. The flange portion 190 cooperates with a stop member 191 secured to the support frame 12 so as to rotate the actuating lever 160 counterclockwise which has the effect through the internal transferring mechanism of each conveyor module 40 to retract the article engaging means 42 to the lowered position for the return travel of the conveyor modules to the start position.

An additional embodiment of the construction of the article engaging means is also illustrated in FIG. 1. As shown therein, the article engaging means 42 in the carrier modules 40b, 40c and 40d are configured such that the end portion will abut the rear of the article 16 so as to push the article 16 to the next advanced support station. However, the article engaging means associated with the conveyor modules 40a and 40e are depicted as having an elongated base portion 192 and rear support 194 which is adapted to lift and carry an article 16 between support stations. In operation, as the article engaging means 42 are rotated to the elevated position, the base 192 will pick up the article 16 from the associated support station and raise it off of the support frames 12 and 14. At the end of the forward travel of the conveyor module, the article engaging means 42 will be retracted to a lowered position, as described above, at which time the article 16 will be deposited on the frame supports 12 and 14 in the next advanced support station. This has the advantage of lifting the article from the support frames during the forward travel which prevents abrasion of the article or enables the article to be lifted over interfering plant equipment. In addition, the unique design of the conveyor modules enables lift and carry functions to be incorporated into any desired station within the conveyor. Previous lift and carry conveyor 10 systems required the entire conveyor, including all of the individual stations, to be raised and lowered as a unit.

In summary, there has been disclosed herein a new and improved accumulating conveyor having a plurality of individual modules associated with each support station. Each module carries a sensing member which is adapted to detect the presence of an article in the next advanced support station. The modules further include a reciprocably mounted actuating rod, the outer ends of which are adapted to engage the corresponding ends of the actuating rods in the adjacent modules. The actuating rod is reciprocated through the cooperation of the sensing member and transferring means carried by each module so as to raise the article engaging members carried by the module to an elevated position to advance an article to the next support station and at the same time to trigger the corresponding actuating rods of the rearward conveyor modules to advance articles from the rearward support stations forward.

What is claimed is:
1. An accumulating conveyor comprising:
a longitudinal frame having a plurality of spaced article support stations through which articles are advanced intermittently from a load station to an unload station on said frame;
support means reciprocally carried by said frame;
a plurality of longitudinally spaced conveyor modules mounted on said support means, each module being associated with one of said article support stations and comprising an enclosed housing;
means for reciprocating said support means and said modules mounted thereon in back and forth strokes such that said modules move between their associated support stations and the adjacent advanced support station;
a plurality of means for sensing the presence of articles in each of said article support stations, one of said plurality of sensing means being mounted externally on each of said modules and adapted to sense the presence of an article in the adjacent advanced article support station;

means, carried externally on each module, for engaging an article in the associated support station, said article engaging means being movable between a lowered, inoperative position and an elevated article engaging position;

means, within each module housing, for transferring said associated article engaging means between lowered and elevated positions; and means, carried within each module housing, for actuating said associated transferring means, said actuating means including a reciprocating rod having its opposite ends extending outward from said housing;

said actuating means being responsive to said associated sensing means to position the associated transferring means in an operative condition when said modules are reciprocated in a forward direction and when said adjacent advanced station is empty to move said article engaging means to an elevated position to engage the article in the associated support station and to transfer said article from said support station to the adjacent advanced station;

said actuating means further being responsive to the sensing means, for positioning into an operative condition said actuating means of all modules therebehind when the adjacent advanced station is empty.

2. The accumulating conveyor of claim 1 wherein the article engaging means is adapted to push the article to the adjacent advanced station.

3. The accumulating conveyor of claim 1 wherein the article engaging means is adapted to raise the article above the support station a predetermined distance and to lower the article onto the adjacent advanced support station at the end of the forward travel of the module.

4. The accumulating conveyor of claim 1 wherein:
opposite ends of the actuating rod of the actuating means of each module are longitudinally aligned with the ends of the actuating rod of the adjacent modules;

the ends of said rod being adapted to alternately abut the ends of said rods in said adjacent modules; and each of said actuating rods being movable to a first position toward the load station of the frame when said modules are reciprocated towards the unload station to actuate its associated transferring means and to place the same in an operative position, and being movable to a second position toward the unload station of said frame when said modules are reciprocated towards the load end of said frame to place said transferring means in an operative position.

5. The accumulating conveyor of claim 1 further including means, associated with each support station, for lowering the sensing means below the bottommost portion of the articles on the support frame as the modules are reciprocated in forward and rearward directions.

6. The accumulating conveyor of 5 wherein the lowering means comprises:
a roller mounted on the sensing means; and
an elongated member having a downward, inclined first surface portion;

wherein said roller engages said member and rides therealong during movement of the modules such that said sensing means is lowered a predetermined amount.

7. The accumulating conveyor of claim 1 further including means, cooperating with the actuating means and operative at the end of travel of the modules in the first direction, for returning all of the article engaging means on the modules to a lowered position.

8. The accumulating conveyor of claim 7 wherein the returning means comprises:
the actuating means of the module located in the load station having an elongated flange portion; and
a stop disposed a predetermined distance along the frame so as to engage said flange portion at the end of travel of the modules in a first direction;
wherein said stop moves said actuating means to actuate the associated transferring means to return the article engaging means to a lowered position.

9. A conveyor module adapted for use in an accumulating conveyor of the type having a longitudinal frame with a plurality of spaced article support stations through which articles are advanced intermittently from a load to an unload station of said frame by reciprocal movement of said conveyor module,
said conveyor module comprising:
an enclosed housing:
means, carried externally by said housing, for sensing the presence of an article, said article sensing means adapted to sense the presence of an article in the adjacent advanced article support station;
article engaging means carried externally by said housing, said article engaging means being movable between a lowered inoperative position and an elevated article engaging position;
means, carried within said housing, for transferring said article engaging means between lowered and elevated positions;
means, carried within said housing, for actuating said transferring means;
said actuating means being responsive to said sensing means to position said transferring means in an operative condition when the adjacent advanced support station is empty to move said article engaging means to an elevated, article engaging position.

10. The conveyor module of claim 9 wherein the actuating means further includes:
an actuating rod reciprocally mounted in the housing and having opposed ends extending outward therefrom; and
first means in said housing for moving said actuating rod back and forth;
said first moving means comprising:
a first shaft rotatably carried within said housing transverse to said actuating rod and having a first end extending externally therefrom;
an actuating lever being fixedly secured to said first shaft; and
means, connected to said first shaft for movement therewith, for connecting said first shaft to said actuating rod so as to transfer rotational movement of said first shaft to said actuating rod;
the sensing means cooperating with said actuating lever to rotate said first shaft upon sensing the absence of an article in the next advanced support station;
the transferring means comprising:

a second shaft rotatably carried within said housing and having a first end extending externally therefrom;

first and second links pivotally connected together at respective first ends;

the second end of said first link being pivotally connected to said actuating rod so as to pivot thereabout as said actuating rod reciprocates; and said second end of said second link being fixedly secured to said second shaft to impart rotational movement thereto;

said article engaging means being pivotally secured to said second shaft and rotatable therewith between said first and second positions.

11. The conveyor module of claim 10 wherein the sensing means is rotatably mounted on the first shaft.

12. The conveyor module of claim 10 further comprising:

a plurality of said modules mounted in adjacent support stations in a longitudinally spaced manner, the outer ends of the actuating rods of each module respectively abutting the outer end of the rod carried by the adjacent modules;

all of said modules having their article engaging means moved to the first position when their associated actuating rods are reciprocated in said other direction; and all of said actuating rods being shifted in said other direction when any module thereahead has its sensing means detecting the absence of a part in the immediate advanced station.

* * * * *